(12) United States Patent
Sarda

(10) Patent No.: US 12,200,097 B2
(45) Date of Patent: *Jan. 14, 2025

(54) SECONDARY PHASE COMPENSATION ASSIST FOR PLL IO DELAY

(71) Applicant: Skyworks Solutions, Inc., Irvine, CA (US)

(72) Inventor: Vivek Sarda, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,924

(22) Filed: Apr. 25, 2023

(65) Prior Publication Data

US 2023/0379132 A1 Nov. 23, 2023

Related U.S. Application Data

(63) Continuation of application No. 17/397,403, filed on Aug. 9, 2021, now Pat. No. 11,671,238, which is a
(Continued)

(51) Int. Cl.
*H04L 7/04* (2006.01)
*H04L 7/00* (2006.01)

(52) U.S. Cl.
CPC .............. *H04L 7/04* (2013.01); *H04L 7/0037* (2013.01)

(58) Field of Classification Search
CPC ....... H04L 7/0037; H04L 7/04; H04L 43/106; H04L 7/0331; H04L 7/0016; H04J 3/0667;
(Continued)

(56) References Cited

U.S. PATENT DOCUMENTS

| 5,140,611 A | 8/1992 | Jones |
| 5,509,038 A | 4/1996 | Wicki |

(Continued)

FOREIGN PATENT DOCUMENTS

| CN | 102291233 | 12/2011 |
| CN | 103684727 | 3/2014 |

(Continued)

OTHER PUBLICATIONS

Maciej Lipinski, Tomasz Włostowski, Javier Serrano, Pablo Alvarez, "White Rabbit: a PTP Application for Robust Sub-nanosecond Synchronization", 2011 IEEE International Symposium on Precision Clock Synchronization for Measurement, Control and Communication, Sep. 12-16, 2011 (Year: 2011).*

(Continued)

*Primary Examiner* — Aristocratis Fotakis
(74) *Attorney, Agent, or Firm* — Knobbe, Martens, Olson & Bear, LLP

(57) ABSTRACT

A line card of a network box receives a SYNC input signal and generates a first time stamp based on receipt of the SYNC input signal. The line card generates a system clock signal in a phase-locked loop and generates a SYNC output signal by dividing the system clock signal in a divider circuit. The SYNC output signal is fed back to an input terminal as a SYNC feedback signal. A time stamp is generated based on receipt of the SYNC feedback signal. The line card determines a time between the SYNC input signal and the SYNC feedback signal based on the first time stamp and the second time stamp. The timing of the SYNC output signal is adjusted based on the time difference using a coarse time adjustment by adjusting a divide ratio of the divider circuit and using a fine time adjustment in the phase-locked loop based on a residue of a remainder of the
(Continued)

time difference not accounted for by the coarse time adjustment.

19 Claims, 10 Drawing Sheets

Related U.S. Application Data continuation of application No. 16/836,706, filed on Mar. 31, 2020, now Pat. No. 11,088,819.

(58) Field of Classification Search
CPC ...... H04J 3/0697; H04J 3/0673; H04J 3/0658; G01R 25/04
See application file for complete search history.

(56) References Cited

U.S. PATENT DOCUMENTS

| | | | |
|---|---|---|---|
| 5,644,604 | A | 7/1997 | Larson |
| 5,964,880 | A | 10/1999 | Liu |
| 6,549,046 | B1 | 4/2003 | Klecka, III |
| 6,760,586 | B1 | 7/2004 | Lee |
| 6,839,858 | B1 | 1/2005 | James |
| 6,885,647 | B1 | 4/2005 | Chung et al. |
| 7,002,996 | B1 | 2/2006 | Dougherty et al. |
| 7,079,589 | B1 | 7/2006 | Maksimovic et al. |
| 7,116,743 | B1 | 10/2006 | Wang |
| 7,203,227 | B1 | 4/2007 | Currivan |
| 7,417,510 | B2 | 8/2008 | Huang |
| 7,451,337 | B1 | 11/2008 | Hewitt |
| 7,451,339 | B2 | 11/2008 | Smith, Sr. |
| 7,535,893 | B1 | 5/2009 | Beladakere et al. |
| 7,860,205 | B1 | 12/2010 | Aweya et al. |
| 7,903,681 | B2 | 3/2011 | Roberts et al. |
| 8,355,476 | B2 | 1/2013 | Lee |
| 8,942,561 | B2 | 1/2015 | Boyd et al. |
| 9,246,615 | B2 | 1/2016 | Ellegard et al. |
| 9,369,270 | B1 | 6/2016 | Spijker |
| 9,426,762 | B2 | 8/2016 | Ehlers et al. |
| 9,479,182 | B1 | 10/2016 | Baidas et al. |
| 9,594,396 | B2 | 3/2017 | Turner et al. |
| 9,628,255 | B1 | 4/2017 | Baidas et al. |
| 9,665,121 | B2 | 5/2017 | Aweya |
| 9,673,970 | B1 | 6/2017 | Aweya et al. |
| 9,860,004 | B2 | 1/2018 | Joergensen |
| 9,960,873 | B2 | 5/2018 | Yang |
| 10,007,639 | B2 | 6/2018 | Mitric |
| 10,075,284 | B1 | 9/2018 | Rodrigues et al. |
| 10,084,559 | B1 | 9/2018 | Devineni |
| 10,158,444 | B1 | 12/2018 | Darras |
| 10,511,312 | B1 | 12/2019 | Pastrello et al. |
| 10,536,258 | B2 | 1/2020 | Choo et al. |
| 10,594,423 | B1 | 3/2020 | Anand et al. |
| 10,715,307 | B1 | 7/2020 | Jin |
| 10,727,845 | B1* | 7/2020 | Balakrishnan .......... H03L 7/093 |
| 10,797,686 | B1 | 10/2020 | Terstrup et al. |
| 10,917,097 | B1 | 2/2021 | Meyer et al. |
| 10,951,216 | B1 | 3/2021 | Barnette et al. |
| 11,088,816 | B1 | 8/2021 | Sarda |
| 11,088,819 | B1 | 8/2021 | Sarda |
| 11,502,812 | B1 | 11/2022 | Sarda |
| 11,664,968 | B2 | 5/2023 | Sarda |
| 11,671,238 | B2 | 6/2023 | Sarda |
| 2006/0020733 | A1 | 1/2006 | Sarda |
| 2006/0280182 | A1 | 12/2006 | Williams et al. |
| 2007/0046516 | A1 | 3/2007 | Dornbusch |
| 2008/0080563 | A1 | 4/2008 | Kataria |
| 2008/0240169 | A1 | 10/2008 | Cui et al. |
| 2009/0024865 | A1 | 1/2009 | Fugaro et al. |
| 2009/0168808 | A1 | 7/2009 | Cho |
| 2009/0251226 | A1 | 10/2009 | Kathuria et al. |
| 2010/0118894 | A1 | 5/2010 | Aweya et al. |
| 2011/0296226 | A1 | 12/2011 | Sorbara et al. |
| 2011/0298508 | A1* | 12/2011 | Wu ................. H03L 7/0807 327/158 |
| 2012/0300795 | A1 | 11/2012 | Joergensen |
| 2012/0319734 | A1 | 12/2012 | Nagaraj |
| 2013/0121347 | A1 | 5/2013 | Saito et al. |
| 2014/0068315 | A1 | 3/2014 | Aweya et al. |
| 2014/0320181 | A1 | 10/2014 | Mitric |
| 2015/0092797 | A1 | 4/2015 | Aweya |
| 2015/0185759 | A1 | 7/2015 | Hinderer et al. |
| 2015/0200770 | A1 | 7/2015 | Rahbar et al. |
| 2015/0207620 | A1 | 7/2015 | Colby |
| 2015/0222276 | A1 | 8/2015 | Milijevic |
| 2016/0170439 | A1 | 6/2016 | Aweya |
| 2016/0182217 | A1 | 6/2016 | Hashizume |
| 2017/0135053 | A1 | 5/2017 | Shenoi et al. |
| 2017/0288801 | A1 | 10/2017 | Aweya |
| 2017/0373824 | A1 | 12/2017 | Mitchler |
| 2018/0331818 | A1* | 11/2018 | Aouini ................. H03L 7/081 |
| 2019/0020333 | A1 | 1/2019 | Koch et al. |
| 2019/0036804 | A1 | 1/2019 | Mihelic et al. |
| 2019/0132813 | A1* | 5/2019 | Jiang ................. G01R 33/422 |
| 2019/0379474 | A1 | 12/2019 | Coulter |
| 2019/0379475 | A1* | 12/2019 | Seethamraju ......... H04J 3/0673 |
| 2020/0021379 | A1 | 1/2020 | Aweya |
| 2020/0028666 | A1 | 1/2020 | Goldin et al. |
| 2020/0050575 | A1 | 2/2020 | Mishra et al. |
| 2020/0127752 | A1 | 4/2020 | Tai et al. |
| 2020/0285265 | A1 | 9/2020 | Rananathan et al. |
| 2021/0157355 | A1 | 5/2021 | Sarda et al. |
| 2021/0297083 | A1 | 9/2021 | Nishikawa |
| 2021/0328758 | A1 | 10/2021 | Sarda |
| 2022/0124655 | A1* | 4/2022 | Liu ......................... H04L 7/06 |
| 2022/0209880 | A1 | 6/2022 | Sarda |

FOREIGN PATENT DOCUMENTS

| | | |
|---|---|---|
| CN | 104378193 | 2/2015 |
| CN | 107294634 | 10/2017 |
| WO | WO 2015/003364 | 1/2015 |

OTHER PUBLICATIONS

82P33831, Synchronization Management Unit for IEEE 1588 and 10G/40G/100G Synchronous Ethernet, Renesas, Jul. 10, 2018 (Year: 2018).

AN-1033, "Delay Variation Measurement and Compensation", Application Note, Renesas, Feb. 8, 2019 (Year: 2019).

AN12149, Implementing an IEEE 1588 V2 on i.MX RT Using PTPd, FreeRTOS, and lwIP TCP/IP stack, NXP Semiconductors, Sep. 2018 (Year: 2018).

AN-950, "82P338XX/9XX Usage of a SYNC Input for Clock Alignment", Application Note, Renesas, Nov. 10, 2016 (Year: 2016).

Broadcom Corp., "Ethernet Time Synchronization Providing Native Timing Within the Network," White Paper, Oct. 2008, 36 pages.

Edison, J., "IEEE-1588 Standard for a Precision Clock Synchronization Protocol for Networked Measurement and Control Systems," Agilent Technologies, 2005, 94 pages.

G.8273/Y.1368(2018)-Amendment 1, Framework of phase and time clocks, ITU-T, Mar. 2020 (Year: 2020).

Gallant, D., "Practical Implementation of a IEEE 1588 Based Synchronization Distribution System," Silicon Laboratories, WSTS Jun. 19, 2018, 15 pages.

Renesas, "Synchronization Management Unit," 8A34002 Datasheet, Renesas Electronics Corporation, Sep. 8, 2020, 107 pages.

Stanton, K., "802.1AS Tutorial", Intel Corporation, Nov. 13, 2008, 42 pages.

Silicon Labs, "UG103.05: IoT Endpoint Security Fundamentals", silabs.com, Rev. 1.2, downloaded Oct. 22, 2020, 12 pages.

U.S. Appl. No. 16/235,784, filed Dec. 28, 2018, to Srisai Rao Seethamraju, entitled "Synchronizing Update of Time of Day Counters Using Time Stamp Exchange Over a Control Plane".

U.S. Appl. No. 16/836,706, filed Mar. 31, 2020, entitled "Secondary Phase Compensation Assist for PLL IO Delay," by Vivek Sarda.

U.S. Appl. No. 16/836,713, filed Mar. 31, 2020, entitled "Secondary Phase Compensation Assist for PLL IO Delay Aligning Sync Signal to System Clock Signal," by Vivek Sarda.

(56) References Cited

OTHER PUBLICATIONS

U.S. Appl. No. 17/134,818, filed Dec. 28, 2020, entitled "FSYNC Mismatch Tracking", by Vivek Sarda.
U.S. Appl. No. 17/375,634, filed Jul. 14, 2021, entitled "Data Protocol Over Clock Line", by Vivek Sarda.

* cited by examiner

SECONDARY PHASE COMPENSATION ASSIST FOR PLL IO DELAY

CROSS-REFERENCE TO RELATED APPLICATION(S)

This application is a continuation of U.S. patent application Ser. No. 17/397,403, filed Aug. 9, 2021, entitled "Secondary Phase Compensation Assist For Pll Io Delay," which is a continuation of U.S. patent application Ser. No. 16/836,706, filed Mar. 31, 2020, entitled "Secondary Phase Compensation Assist for PLL IO Delay," naming Vivek Sarda as inventor, which application is incorporated herein by reference in its entirety.

This application relates to the application entitled "Secondary Phase Compensation Assist for PLL IO Delay Aligning SYNC Signal to System Clock Signal", naming Vivek Sarda as inventor, patent application Ser. No. 16/836,713, filed Mar. 31, 2020, which application is incorporated herein by reference in its entirety.

BACKGROUND

Field of the Invention

This invention relates to network timing and more particularly to reducing errors in network timing signals.

Description of the Related Art

Network communication boxes use timing protocols to ensure time of day (ToD) counters in the network are synchronized. SYNC signals are used to update time of day counters at the same time in the network. Any delay/offset and process, voltage, temperature (PVT) variation between the SYNC lines being supplied to the ToD counters in each line card in the network box results in an error that is classified as Continuous Time Error (CTE). The CTE budget for a network box is 5 ns for Class D type network boxes. Reducing sources of timing error in network boxes would give greater flexibility to designers to meet the CTE budget.

SUMMARY OF EMBODIMENTS OF THE INVENTION

Accordingly, in one embodiment a method includes receiving a SYNC input signal and generating a SYNC output signal, the SYNC output signal indicating when to update a time of day counter. The method further includes feeding back the SYNC output signal to an input terminal as a SYNC feedback signal and determining a time difference between the SYNC input signal and the SYNC feedback signal. A timing of the SYNC output signal is adjusted based on the time difference.

In another embodiment an apparatus includes a first input terminal to receive an input SYNC signal. A phase-locked loop generates a system clock signal. A divider circuit divides the system clock signal and generates a SYNC output signal. A time of day counter is coupled to the SYNC output signal and updates a count value responsive to the SYNC output signal. A second input terminal is coupled to receive the SYNC output signal as a feedback SYNC signal. Arithmetic logic determines a time difference between the SYNC input signal and the SYNC output signal and control logic adjusts a timing of the SYNC output signal based on the time difference.

In another embodiment a method includes receiving a SYNC input signal and generating a first time stamp based on receipt of the SYNC input signal. The method further includes generating a local system clock signal in a phase-locked loop and generating a SYNC output signal by dividing the local system clock signal in a divider circuit. The SYNC output signal is fed back to an input terminal as a SYNC feedback signal. A time stamp is generated based on receipt of the SYNC feedback signal. A time difference is determined between the SYNC input signal and the SYNC feedback signal based on the first time stamp and the second time stamp. The timing of the SYNC output signal is adjusted based on the time difference using a coarse time adjustment by adjusting a divide ratio of the divider circuit and using a fine time adjustment using the phase-locked loop based on a residue of a remainder of the time difference not accounted for by the coarse time adjustment.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
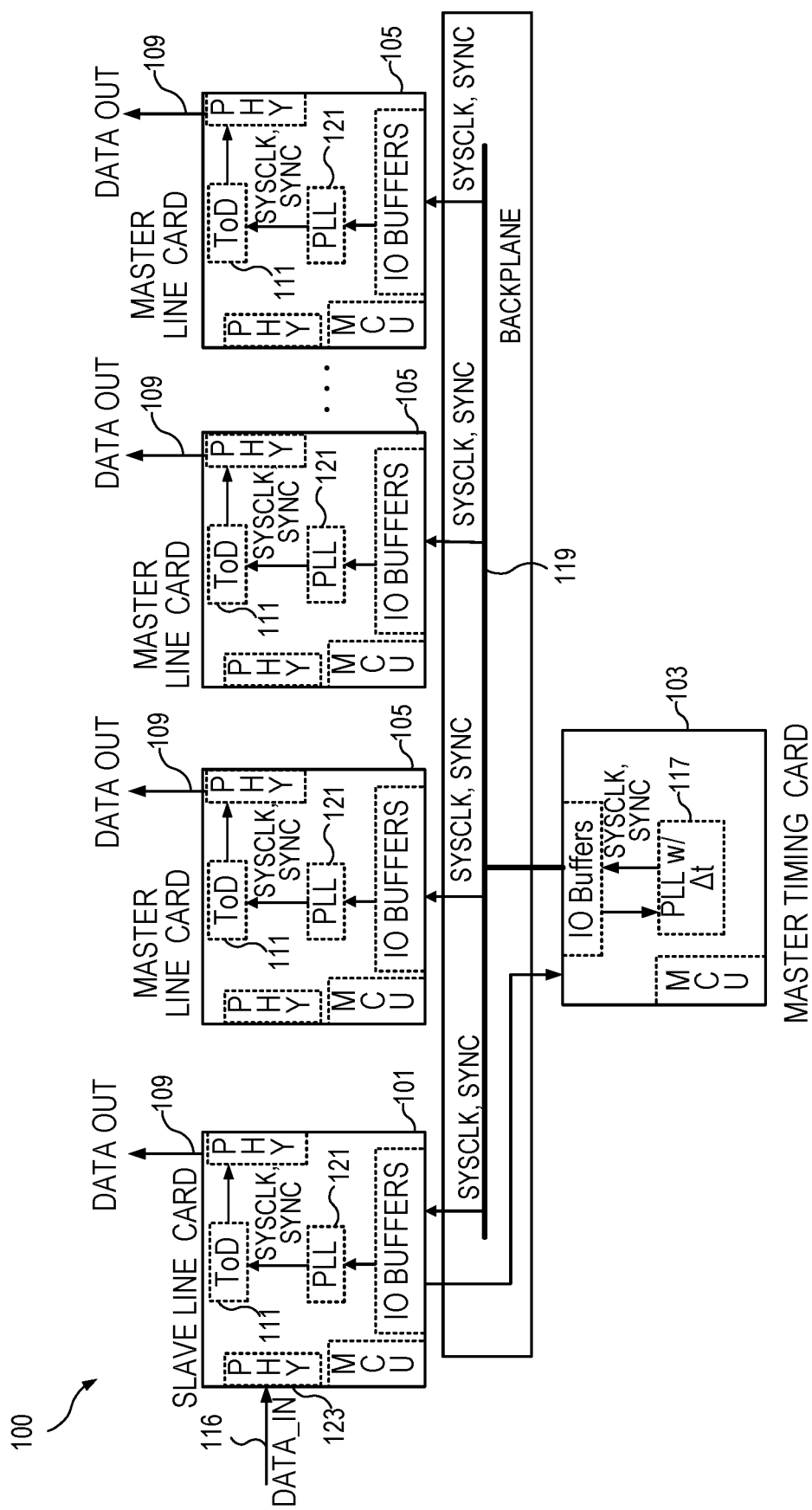
FIG. 1 illustrates a typical communication network box with a slave line card (LC), a master timing card (TC), and multiple master line cards coupled through a backplane.

FIG. 1 shows a typical architecture of communication network box 100 with a slave line card (LC) 101, a master timing card (TC) 103, and multiple master line cards 105. The data_out 109 from each line card is time stamped using time stamps from local Time of Day (ToD) counters 111. One challenge is to keep the ToD on the slave line card in alignment with the network timestamps from the incoming data stream on data_in 116. Another challenge is to maintain the ToD counters across different line cards in alignment over process, voltage, and temperature (PVT) variations so that all data_out 109 with their time stamps are aligned with each other and the incoming network time supplied on data_in 116.

The master timing card 103 supplies a SYNC signal and system clock signal (SYSCLK) to the slave line card 101 generated using PLL 117 and dividers (not shown). The SYNC signal is also referred to as the FSYNC (frame sync) signal in certain contexts as the signal has different names (SYNC or F SYNC) at the system level or integrated circuit level inside the network box. The signal will be referred to as the SYNC signal herein for ease of reference. The master timing card 103 supplies the SYSCLK and SYNC signal to all of the master line cards 105 over backplane 119. The SYNC signal is a global signal inside the network system box 100 that signifies the right moment/edge for the Time of Day (ToD) counters 111 to rollover. The SYNC signal has a frequency range of 1 kHz to pp2s (pulse per 2 seconds). In many network systems the SYNC signal is 1 pulse per second (1 PPS). SYNC is an integer divided down and edge aligned version of the system clock signal SYSCLK. The SYNC output from the master timing card (TC) is the global SYNC used by all the line cards (LC) for their ToD rollover alignment. The various ToD counters 111 contain the same value and turnover at the same time based on the SYNC signal. Each of the line cards 101 and 105 generate the SYNC signal by dividing the SYSCLK generated by PLL 121 in a divider (not shown in FIG. 1) to the desired frequency.

Figure 2:
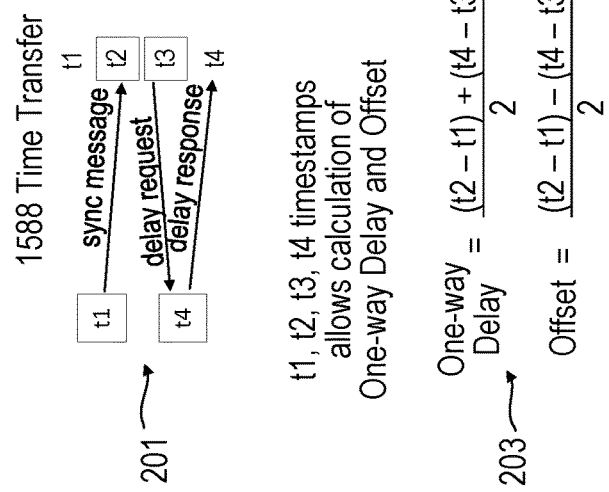
FIG. 2 illustrates an example of a time stamp exchange.

The exact position of the SYNC edge is derived using a precision time protocol (PTP) servo loop that uses the time information inside the incoming Synchronous Ethernet (SyncE) packet stream to the slave line card 101. FIG. 2 illustrates an example of a time stamp exchange 201 between an upstream PHY and the downstream pHY (e.g. PHY 123 in FIG. 1). Each of the time stamps t1-t4 represents the departure time (t1, t3) or the receive time (t2, t4). The timestamps exchange allows determination of one-way delay (OWD) and error offset between the upstream PHY and the downstream PHY shown at 203. That time stamp exchange allows the slave line card to determine the correct time provided by the upstream PHY even with delays between the upstream PHY and the downstream PHY. Note that the high level description of the PTP servo loop is provided as background information to provide context in which various embodiments described herein can be utilized.

The slave line card and the master timing card also have a closed loop PTP servo system in accordance with the IEEE 1588 protocol that corrects the position of the SYNC signal over process, voltage, and temperature (PVT) and aligns the SYNC signals distributed by the master timing card 203 to the time stamps of the incoming packet stream to the slave line card. The servo loop ensures that the slave line card and the master timing card are synchronized. The slave line card 101 and the master timing card 103 exchange information in the closed loop system to adjust the CLK and SYNC pair on the master timing card such that the slave line card ToD is aligned with the network ToD of the chosen incoming data stream on data_in 116. The PTP servo loop adjusts the timing of SYNC by adjusting PLL 117 so that the slave line card ToD is aligned in frequency and phase to the upstream ToD received by the slave line card on data_in 116. The distributed SYSCLK is supplied as a reference clock to the PLL 121 within each of the line cards and the line card PLLs generate a local SYSCLK and SYNC signal that is phase and frequency aligned with the distributed SYSCLK and SYNC signal. The master line cards 105 are duplicates (up to 64 copies) of the slave line card 101 but without the closed loop PTP servo loop. In other words, the distribution of the CLK/SYNC pair to the master line cards 105 is open loop (without the PTP closed loop adjustments).

Figure 3:
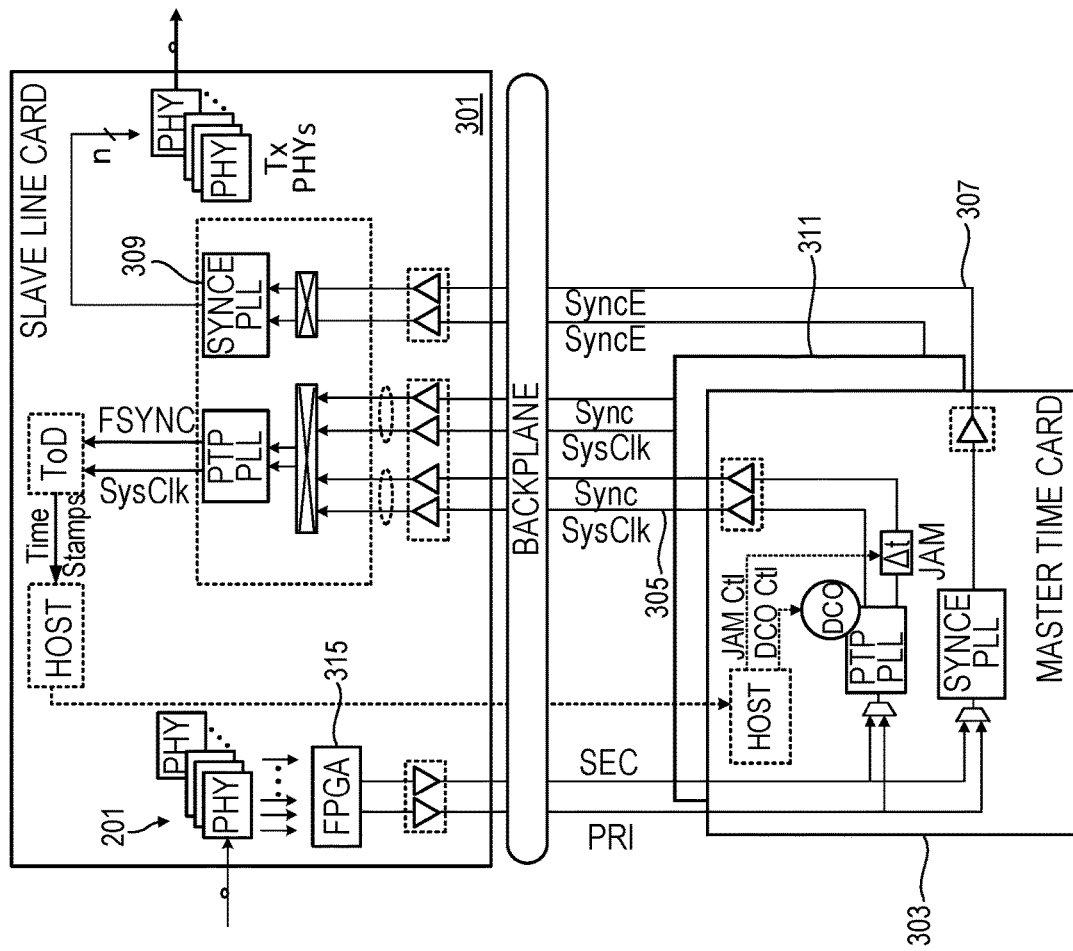
FIG. 3 illustrates additional details of a slave line card and a master timing card.

Referring to FIG. 3 additional aspects of the slave line card 301 and the master time card 303 are shown. In addition, to generating the SYSCLK 305, the master time card generates a Synchronous Ethernet (SyncE) clock signal 307. The SyncE clock signal is supplied to SyncE PLL 309 in the slave line cards so that the local SyncE clock signals are frequency and phase locked to the SyncE clock signal in the master timing card. Embodiments include a slave timing card 311 that functions as a backup timing card to the master timing card 303 by providing backup SYNC, SYSCLK, and SyncE signals. The FPGA 315 is part of the PTP loop and includes an MCU to implement PTP software. PRI and SEC are primary and secondary data streams to select from for determining the network time. SEC is a backup of PRI. The PTP PLLs in the slave line card and the master timing card are used to adjust the SYSCLK (and SYNC) based on the PTP servo loop. The various time stamps required for the PTP servo loop are exchanged between the hosts on the slave line card and the master timing card. The hosts are microcontroller units (MCUs) or field programmable gate arrays (FPGAs) with some processing and communication abilities. The digitally controlled oscillator (DCO) in the master timing card 303 adjusts the phase of the SYNC and SYSCLK in accordance with the calculations of the PTP servo loop so that the SYNC at the ToD counter on the slave line card occurs at the desired time.

Any delay/offset and PVT variation between the SYNC lines to the ToD's in each line card and the slave timing card in the network box results in an error that is classified as Continuous Time Error (CTE). The CTE budget for a network box is 5 ns for Class D type network boxes. One source of error is that the SYNC signal and SYSCLK supplied by the local PLLs in the line cards still have to transit through the circuitry of the PLL to the ToD counters. A mismatch exists in SYNC signal delivery due to PVT differences between the line cards including the slave line card and the master line cards. That mismatch impacts the accuracy of the timestamps in every Master LC and impacts the Continuous Time Error (CTE) budget of 5 ns for a Class D network box.

Figure 4A:
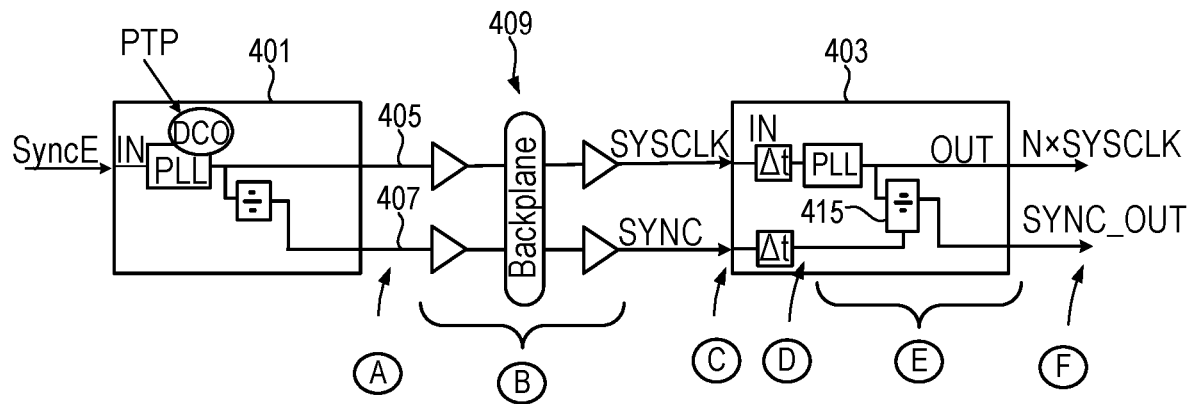
FIG. 4A illustrates another view of a portion of a network box.
Figure 4B:
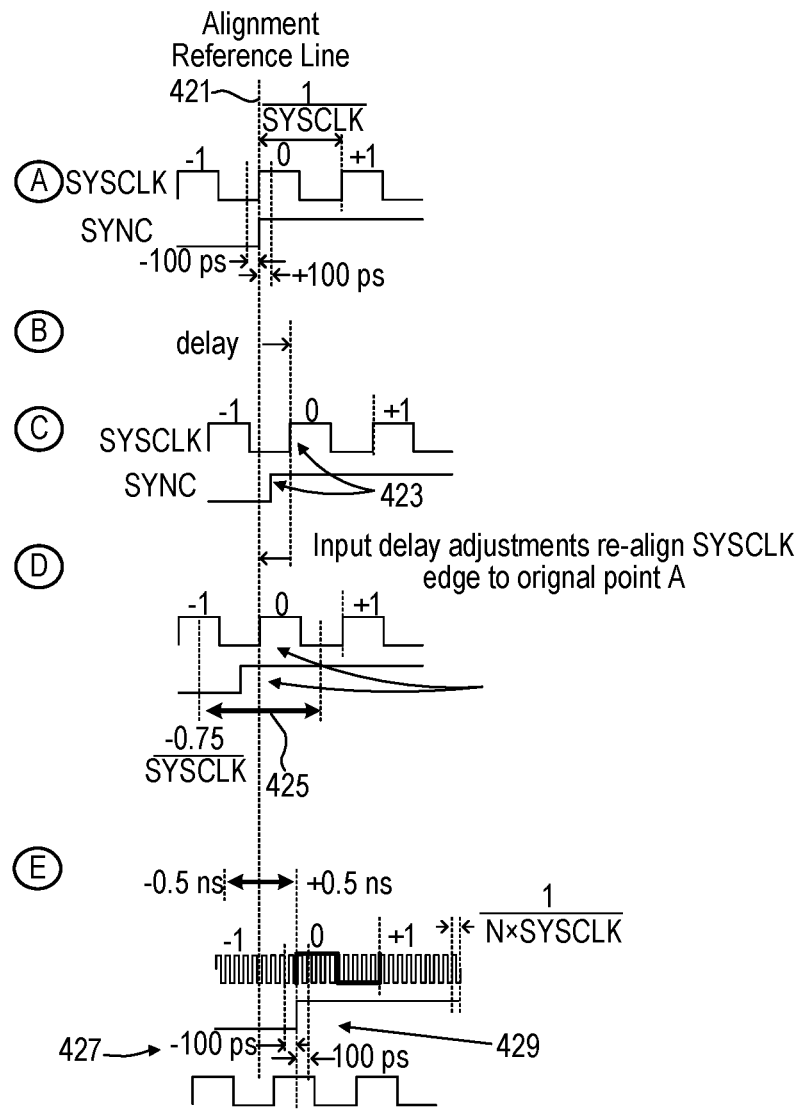
FIG. 4B illustrates the timing relationships that can exist between the SYNC signal and the SYSCLK signal in the network box illustrated in FIG. 4A.
Figure 4C:
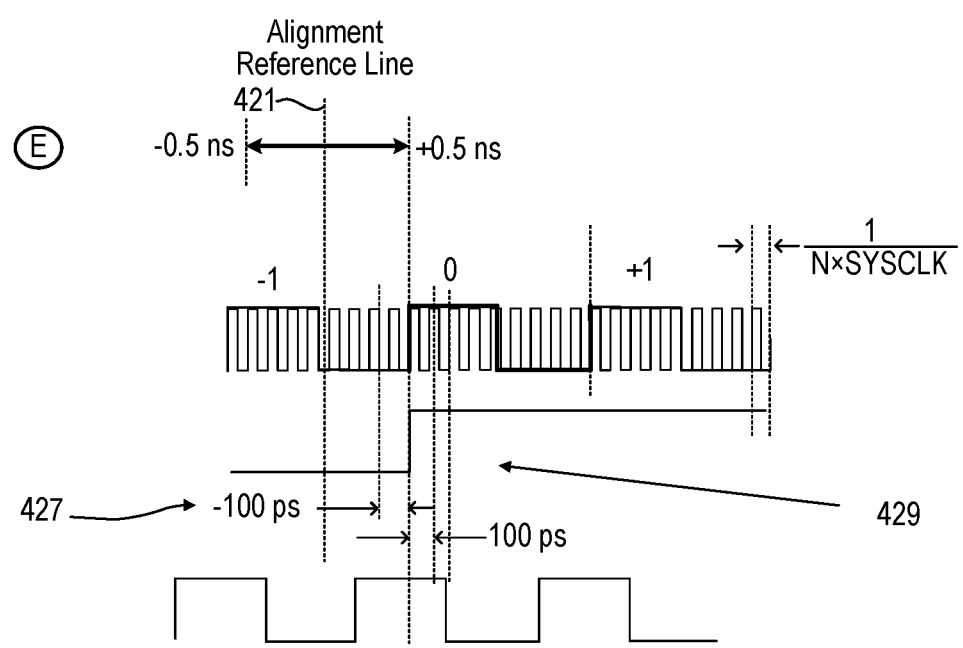
FIG. 4C illustrates a larger view of section E of FIG. 4B.

FIGS. 4A and 4B illustrate the timing relationships that can exist between the SYNC signal and the SYSCLK signal. FIG. 4A shows a master timing card 401 supplying a line card 403 with the SYSCLK signal 405 and the SYNC signal 407 through backplane drivers, receivers and PCB traces 409. At A, SYNC identifies the SYSCLK period that coincides with ToD rollover. In the example of FIG. 4B, that period is period 0 with period (−1) and period (+1) before and after period 0. In an embodiment SYNC can be adjusted to any SYSCLK period by aligning the rising edges of SYSCLK and SYNC. In the example of FIG. 4B SYNC selects the SYSCLK period 0. The Δt boxes shown in FIG. 4A represent the adjustments made to account for the delay in the SYNC and SYSCLK signals supplied from the master timing card 401. Note that since SYSCLK may be frequency multiplied at the line card output as shown in FIG. 4A (N×SYSCLK), setting this lower frequency SYSCLK period can be considered a coarse adjustment. Backplane drivers, receivers and PCB traces 404 cause a delay in the SYSCLK period 0 rising edge at C with respect to the alignment reference line 421. In addition, there is a mismatch between SYNC and SYSCLK shown at 423. At D, input delay adjustments in the line card realign the SYSCLK edges back to the original alignment reference line 421 but do not realign SYSCLK and SYNC. Even if the SYSCLK and SYNC edges remain misaligned as shown at D, the SYNC signal in the indicated range 425 will select the SYSCLK period 0. Input to output delay in the illustrated embodiment, causes misalignment of the SYSCLK rising edge with respect to the alignment reference line 421. Referring now to E of FIGS. 4A and 4B, if the misalignment is left without correction (open loop), the misalignment can range between ±0.5 ns around the alignment reference line as shown at 425. Alternatively, a zero delay mode with respect to the SYSCLK can achieve ±100 ps as shown at 427. As shown at 429, the SYNC signal is realigned to the rising edge of SYSCLK period 0. FIG. 4C shows a larger view of E of FIG. 4B. The SYNC signal can also be adjusted to any edge of N×SYSCLK (controlled at the line card). That is considered to be a fine adjustment. While open loop and zero delay options provide solutions, if the IO delay is measured and the adjustment is made to SYNC based on the IO delay, the error can be reduced to ±50 ps.

Figure 5:
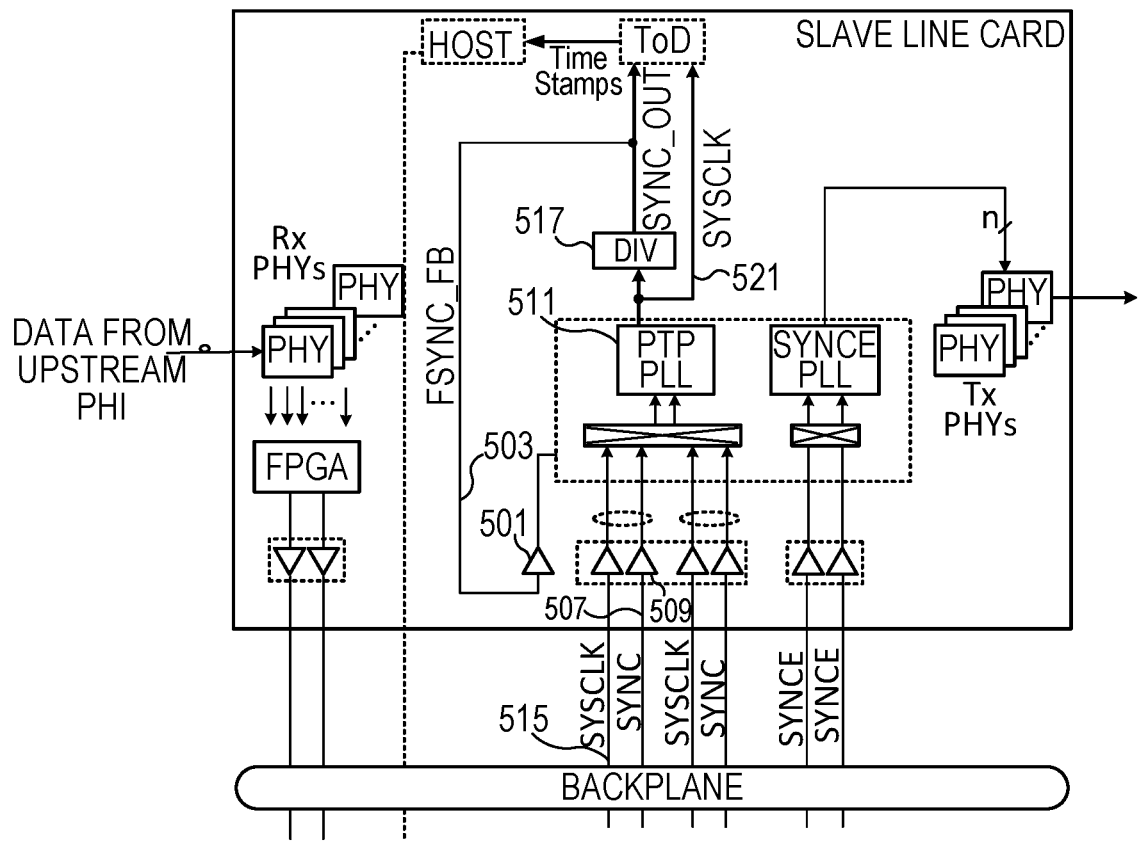
FIG. 5 illustrates an embodiment in which the SYNC output signal (SYNC_OUT) is looped back as an input.

Accordingly, referring to FIG. 5, in order to measure the IO delay, the SYNC output signal (SYNC_OUT) is looped back to the slave line card input buffer 501 as the SYNC feedback signal (SYNC_FB) 503. That allows the IO delay to be tracked and accounted for over PVT variations. The SYNC_FB signal is time stamped and that time stamp is compared to the current valid SYNC time stamp for the SYNC input signal 507 received on input buffer 509. The measured IO delay can include delay caused by input buffers, the PLL 511, divide logic 517, and other clock tree buffers on the line card. While the slave line card is shown, the same approach is used for the master line cards, each of which feedback their SYNC signal to a master line card input buffer.

The SYNC signal 507 is received at buffer 509 and is used, along with SYSCLK 515, to adjust the PLL 511 to ensure the SYNC_OUT and local SYSCLK 521 generated in the line card is phase and frequency aligned with the input SYNC and SYSCLK from the master timing card. The SYNC_OUT signal is generated by an integer divide in divider 517 of the local SYSCLK 521 generated by the PLL 511 that is aligned in phase and frequency to SYSCLK.

Figure 6:
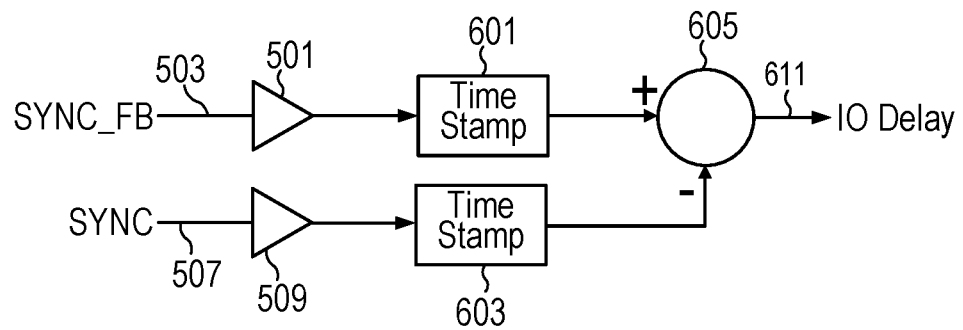
FIG. 6 illustrates logic to time stamp and compare the time stamps.

FIG. 6 illustrates logic to time stamp and compare the two time stamps. Receive buffer 501 receives the SYNC_FB signal 503 and supplies the SYNC_FB signal to time stamp logic 601. Time stamp logic 603 receives the input SYNC signal 507 through buffer 509. The time stamp logic functions as a time to digital converter and converts the transitions of the SYNC_FB signal and the input SYNC signal to digital values based on an available timing reference. Difference logic 605 receives the two time stamps and determines the difference between the time stamps of SYNC_FB 503 and the currently valid SYNC signal 507. That difference 611 represents the input/output (IO) delay. The difference logic may be part of the SYNC control block 701 shown in FIG. 7.

Figure 7:
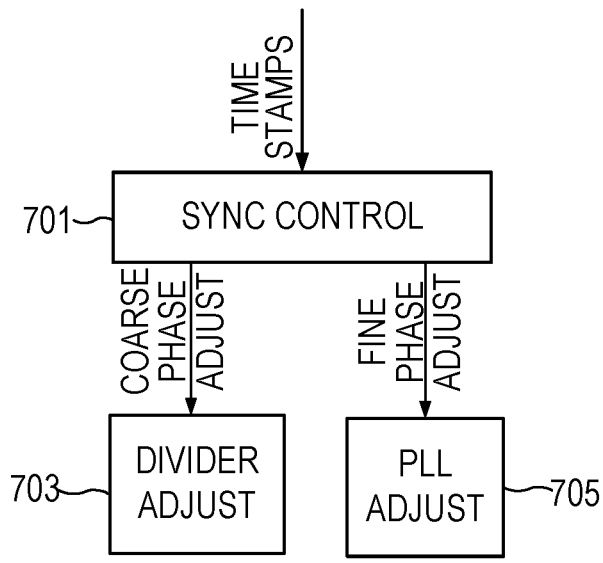
FIG. 7 illustrates a SYNC control block that receives the time stamps, determines the IO delay, and controls both a coarse adjust and a fine adjust to remove the IO delay from the SYNC output signal (SYNC_OUT).
Figure 8:
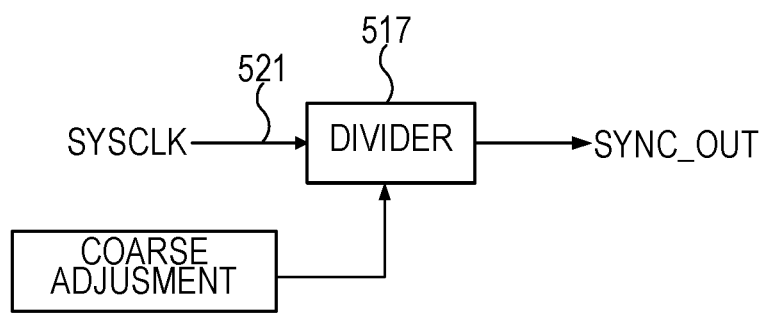
FIG. 8 illustrates a block diagram of an implementation of the coarse adjustment.
Figure 9:
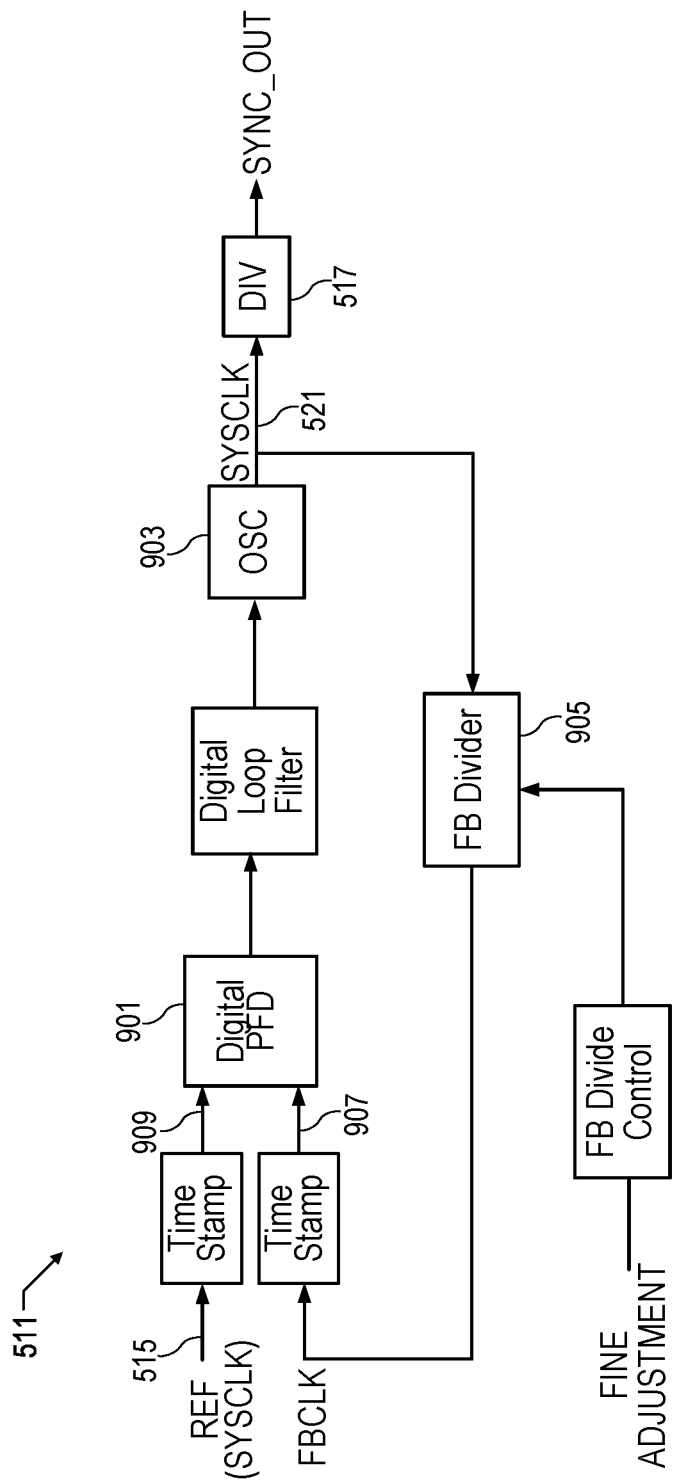
FIG. 9 illustrates an embodiment of a phase-locked loop (PLL) used for the fine adjustment.

Referring to FIG. 7, in an embodiment the SYNC control block 701 receives the time stamps, determines the IO delay, and controls both a coarse adjust 703 and a fine adjust 705 to remove the IO delay from the SYNC output signal to better align the SYNC output signal with the SYNC input signal. The functionality of the control block may be implemented as a state machine and other discrete control logic, in a programmed microcontroller, FPGA, or in a suitable combination of a programmed microcontroller, FPGA, and/or discrete control logic. Referring to FIG. 8, the coarse adjustment is implemented by adjusting the divider 517. For example, if divider 517 divides by an integer N without IO correction, with IO correction divider 517 divides by N±M, where M is an integer corresponding to at least a portion of the IO delay as explained further herein. The fine adjustment is made by adjusting an offset to the phase and frequency detector (PFD) 901 of the feedback divider 905 of the PTP PLL 511 shown in FIG. 9 in more detail. The combination of the coarse adjustment and the fine adjustment substantially eliminates the measured IO delay associated with the SYNC_out signal (or applies any desired offset to the SYNC_out signal). Still referring to FIG. 9, PLL 511 receives SYSCLK 515 as the reference clock signal. Once PLL 511 is locked to SYSCLK 515, divider 517 generates the SYNC_OUT signal that is looped back as SYNC_FB. In an embodiment, the PTP PLL 511 has a loop bandwidth of between, e.g., 40 Hz and 100 Hz.

Referring back to FIG. 4A, conceptually, the input SYNC signal can be used to align the output SYNC signal by using the input SYNC signal 407 to reset the divider 415. In that way, SYNC_OUT will then be aligned with the input SYNC signal.

Figure 10:
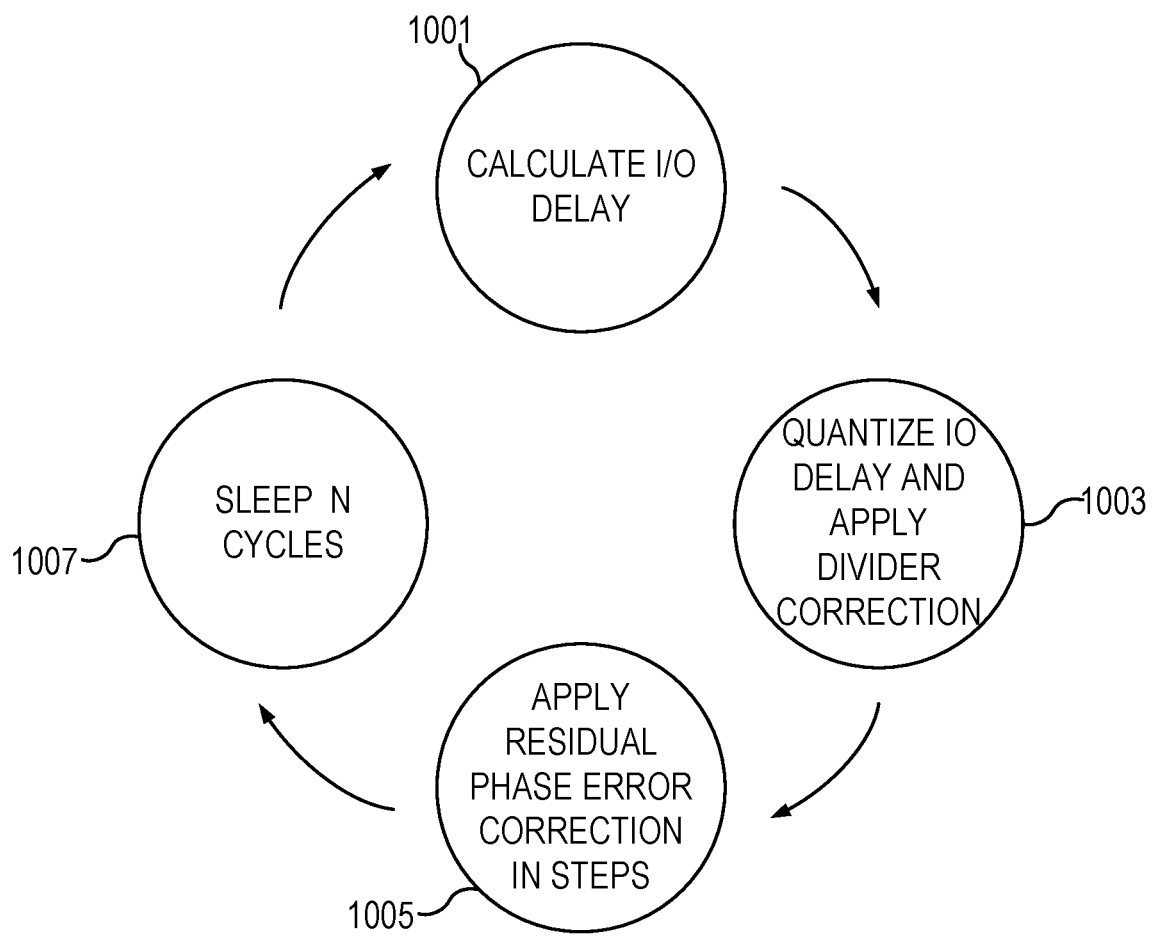
FIG. 10 illustrates a flow diagram of the operation of the SYNC control logic.

Another approach utilizes the time stamps as discussed herein. Referring to FIG. 10, a flow diagram illustrates the operation of the SYNC control logic 701. In 1001 the control logic determines the IO delay by comparing the time stamps for SYNC_FB 503 and SYNC 507. The SYNC logic 701 calculates the quantized SYSCLK cycles of IO delay correction and applies that quantized value to the output divider 517 in the SYNC_OUT path. For example, in an embodiment the OSC 903 is a voltage controlled oscillator (VCO) providing a VCO output signal with a frequency of 10 GHz. With counter 517 being clocked by the VCO output signal, that results in the counter counting in 100 picosecond (ps) increments. Assume that the IO delay was measured to be 35.033 ns. The SYNC logic quantizes the IO delay in terms of a number of divider (or counter) cycles to add or subtract and applies the divider correction in 1003. The SYNC control logic 701 then applies the residue left from the coarse IO delay correction to make the fine adjustment in 1005 using the PLL. For example, assume the divider is implemented as a counter that counts N SYSCLK cycles and then issues a pulse indicating the N count has been reached. The counter then resets and counts again, thus issuing a pulse every N cycles of SYSCLK. The 35 ns can be accounted for using the coarse correction by causing the counter to count 35 ns worth of fewer increments (in counter increments of 100 ps each) to zero out the IO delay (except for the residue). Note that the change in count is made for only one SYNC_OUT cycle. Adjusting the count value of the counter is one way of adjusting the divider value of the divider. While the example shown in FIG. 9 utilizes a high speed counter clocked by the VCO, other embodiments utilize a counter clocked by a lower frequency clock signal. Thus, the SYNC control logic may quantize the IO error for one or more lower speed counters (or both low speed and high speed counters) before determining the residue. In the example being considered, the 0.033 ns (33 ps) cannot be accounted for by the coarse adjust. Referring again to FIG. 9, the PLL can be adjusted by adjusting the feedback divider 905. In other embodiments in which the PFD 901 receives digital values, the fine adjustment can be made by adjusting the digital time stamp 907 of the feedback clock being supplied to the PFD 901 or even the digital time stamp 909 of the reference clock signal. The SYNC control logic applies the residue correction slowly, e.g., at less than ⅛ of the loop bandwidth of the PLL so as not to cause an undesirable large perturbation to the VCO output signal. The measured IO delay between SYNC IN and SYNC_OUT is thereby reduced to zero (or other desired offset). Finally, in 1007, the SYNC control logic recalculates the actual IO delay every S cycles of SYNC, where S is an integer, and makes the coarse and fine adjustments to zero out any detected IO delay. Note that embodiments compare the measured IO delay to a threshold amount of IO delay before making the coarse and fine adjustments so that the adjustments are not being continually made in response to random phase noise.

Figure 11:
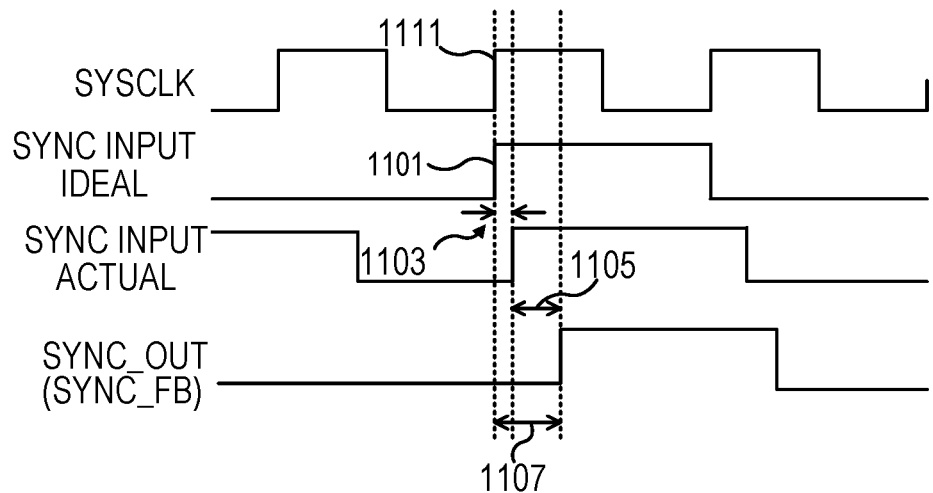
FIG. 11 illustrates a timing diagram of possible relationships between the SYSCLK, SYNC signal, and SYNC_OUT signal.

While the embodiment of FIG. 10, time aligns SYNC_OUT with SYNC, other embodiments align SYNC_OUT directly with SYSCLK. Referring to FIG. 11, the timing diagram illustrates how SYSCLK and SYNC may be misaligned. Ideally, the SYNC input signal is aligned at 1101 with SYSCLK. However, due to variations in delays associated with transmit and receive buffers and the backplane traces, the actual SYNC input signal received at the line card may be misaligned with respect the SYSCLK as shown at 1103. The SYNC_FB IO delay with respect to the actual SYNC input signal is shown at 1105. However, rather calculating the IO delay with respect to the time stamped actual SYNC input signal and realigning to the actual SYNC input signal, embodiments realign the SYNC output signal to SYSCLK. Thus, the correction is made to realign SYNC_OUT (SYNC_FB) to SYSCLK instead of the misaligned actual SYNC input signal by calculating the IO delay 1107 between SYNC_FB and SYSCLK rather than the delay 1105 between SYNC_FB and SYNC actual. The active edges (e.g., the rising edges) of SYSCLK may be time stamped by the time stamper 925 (see FIG. 9) or another time stamper and SYNC and SYNC_FB time stamped as described in FIG. 6.

Figure 12A:
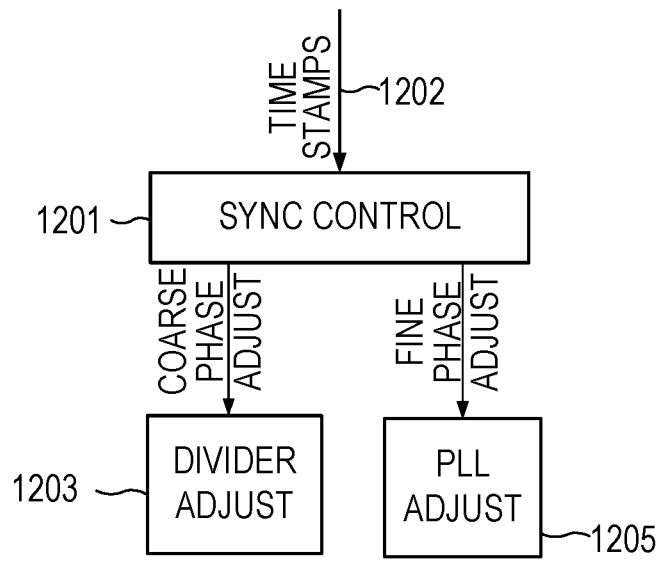
FIG. 12A illustrates a block diagram showing the SYNC control block.

Referring to FIG. 12A, the functionality of the SYNC control block 1201 is modified from the SYNC control block 701 (FIG. 7) to align the SYNC output signal to the input SYSCLK signal rather than the SYNC input signal. The modified control block receives the time stamps 1202 of SYSCLK, SYNC_FB and the SYNC input signal, determines the closest SYSCLK edge to the SYNC input signal time stamp, determines the IO delay to align the SYNC output signal to the closest input SYSCLK edge, and controls both a coarse adjust 1203 and a fine adjust 705 to remove the IO delay from the SYNC output signal to better align the SYNC output signal with the SYNC input signal.

Figure 12B:
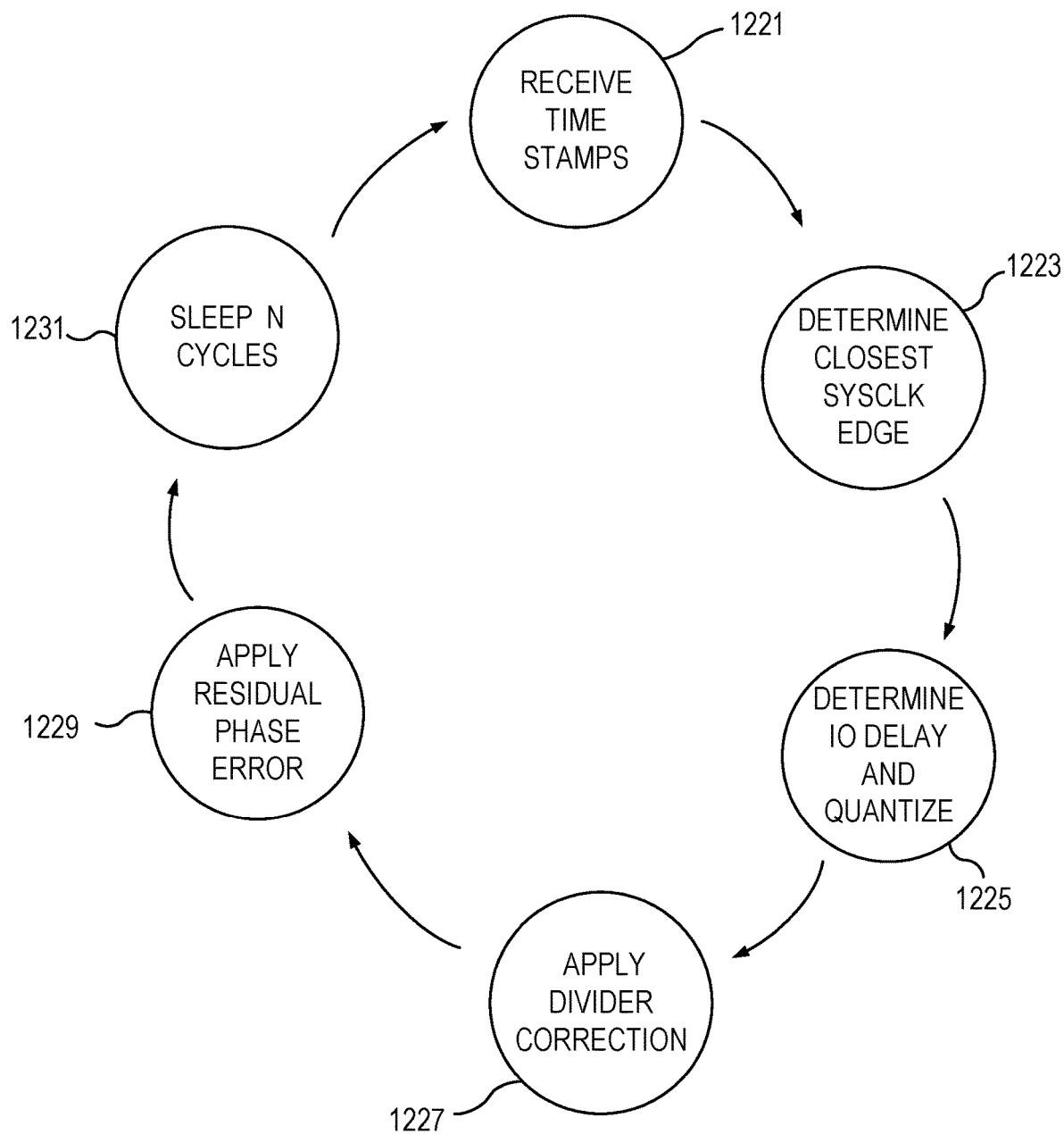
FIG. 12B illustrates a flow diagram of operation of control logic to realign the SYNC output signal (SYNC_OUT) to the input SYSCLK signal.

FIG. 12B illustrates the control flow to realign to SYSCLK. The control functionality described in FIGS. 12A and 12B may be implemented in a state machine and/or other discrete control logic, in a programmed microcontroller or FPGA, or in a suitable combination of a programmed microcontroller, FPGA, and/or discrete control logic. The control logic in 1221 receives the time stamp for the SYNC input signal (for the valid SYNC signal) corresponding to the SYNC_FB signal, the time stamp for SYNC_FB, and time stamps of the SYSCLK edges. Then, the control logic determines in 1223 the closest SYSCLK edge to the SYNC input signal time stamp. In the example of FIG. 11, the closest edge is edge 1111. The closest edge can be determined from SYSCLK time stamps and the SYNC input signal time stamp. A suitable number of SYSCLK time stamps are kept to ensure the closest SYSCLK edge is available. The closest SYSCLK edge is the smallest difference between the time stamps of the SYNC input signal and SYSCLK. Then, the IO delay is determined in 1225 as the difference between the SYSCLK time stamp (closest edge) and SYNC_FB (equivalent to SYNC_OUT). The IO correction is quantized in terms of the divider increments in 1225 and the quantized value applied in 1227 in a coarse correction by adjusting the divider supplying the SYNC_OUT signal. The residue after quantization is applied in 1229 using a fine correction as described earlier. In 1231, the control logic waits for N cycles and then recalculates the IO delay to track changes in the IO delay due to temperature, voltage, or other environmental changes.

In at least one embodiment the IO delay realignment is programmable to be either to the SYNC input signal or to the SYSCLK and thus the SYNC control logic includes the functionality to determine the IO error with respect to both input signals. The programmability may be implemented over a programming interface (not shown) of the integrated circuit implementing the realignment.

The description of the invention set forth herein is illustrative and is not intended to limit the scope of the invention as set forth in the following claims. Variations and modifications of the embodiments disclosed herein may be made based on the description set forth herein, without departing from the scope of the invention as set forth in the following claims.

What is claimed is:

1. A method of adjusting a timing signal comprising:
generating a local system clock signal;
generating an output timing signal by dividing the local system clock signal by a divide value, the output timing signal indicating when to update a counter;
feeding back the output timing signal as an output timing feedback signal;
determining a time difference between an input timing signal and the output timing feedback signal; and
adjusting the divide value to adjust a timing of the output timing signal based on the time difference.

2. The method of claim 1 further comprising, based on a residue of the time difference not accounted for by adjusting the divide value, adjusting the local system clock signal.

3. The method of claim 2 wherein adjusting the local system clock signal is performed by adjusting a phase locked loop used to generate the local system clock signal.

4. The method of claim 1 wherein determining the time difference includes:
generating a first time stamp based on receipt of the input timing signal;
generating a second time stamp based on receipt of the output timing feedback signal; and
determining the time difference by determining a difference between the first time stamp and the second time stamp.

5. The method of claim 1 further comprising adjusting a timing of the output timing signal based on the time difference to obtain a zero delay timing output signal such that a time difference between the input timing signal and the output timing signal is substantially zero.

6. A network timing circuit comprising:
a clock generator configured to generate a local system clock signal;
a divider circuit configured to divide the local system clock signal by a divide value to generate an output timing signal;

a counter coupled to the output timing signal and configured to update a count value responsive to the output timing signal;

logic configured to determine a time difference between a input timing signal and a feedback of the output timing signal and to determine an adjustment to the divide value to adjust a timing of the output timing signal based on the time difference.

7. The network timing circuit of claim 6 further comprising:
a first time stamper to provide a first time stamp indicative of receipt of the input timing signal;
a second time stamper to generate a second time stamp indicative of receipt of the feedback of the output timing signal, the time difference being based on a difference between the first time stamp and the second time stamp.

8. The network timing circuit of claim 6 wherein the clock generator includes a phase-locked loop.

9. The network timing circuit of claim 6 wherein the logic is further configured to adjust a timing of the output timing signal based on the time difference to obtain a zero delay output timing signal such that a time difference between the input timing signal and the output timing signal is substantially zero.

10. The network timing circuit of claim 6 wherein the logic is responsive to a predetermined number of system clock cycles having occurred after adjusting the timing of the output timing signal based on the time difference, and the logic is responsive to readjust the timing of the output timing signal based on a newly determined time difference between a later output timing feedback signal and a later input timing signal.

11. A network timing unit comprising:
a clock generator configured to generate a local system clock signal;
a divider circuit configured to divide the local system clock signal by a divide value to generate an output timing signal;
a counter coupled to the output timing signal and configured to update a count value responsive to the output timing signal;
logic configured to determine a time difference between a input timing signal and a feedback of the output timing signal and to determine an adjustment to the divide value to adjust a timing of the output timing signal based on the time difference; and
a transmitter configured to output network data.

12. The network timing unit of claim 11 wherein the transmitter is included in an Ethernet PHY.

13. The network timing unit of claim 11 further comprising:
a first time stamper to provide a first time stamp indicative of receipt of the input timing signal;
a second time stamper to generate a second time stamp indicative of receipt of the feedback of the output timing signal, the time difference being based on a difference between the first time stamp and the second time stamp.

14. The network timing unit of claim 11 wherein the clock generator includes a phase-locked loop.

15. The network timing unit of claim 11 wherein the logic is further configured to adjust a timing of the output timing signal based on the time difference to obtain a zero-delay output timing signal such that a time difference between the input timing signal and the output timing signal is substantially zero.

16. The network timing unit of claim 11 wherein the logic is responsive to a predetermined number of system clock cycles having occurred after adjusting the timing of the output timing signal based on the time difference, and the logic is responsive to readjust the timing of the output timing signal based on a newly determined time difference between a later output timing feedback signal and a later input timing signal.

17. A slave line card including the network timing unit of claim 11.

18. A network communication system including the slave line card of claim 17, a master timing card, and a plurality of master line cards.

19. The network communication system of claim 18 further comprising a backplane, the slave line card, the master timing card, and the plurality of master line cards coupled to the backplane.

* * * * *